US008794393B2

(12) United States Patent
Argirovski (10) Patent No.: US 8,794,393 B2
(45) Date of Patent: Aug. 5, 2014

(54) COMPACT DISC-BRAKE UNIT FOR VEHICLES ON RAILS

(75) Inventor: Vasil Argirovski, Skopje (MK)

(73) Assignee: POLI Costruzione Materiali Trazione S.R.L., Camisano (IT)

( * ) Notice: Subject to any disclaimer, the term of this patent is extended or adjusted under 35 U.S.C. 154(b) by 918 days.

(21) Appl. No.: 12/309,725

(22) PCT Filed: Jul. 30, 2007

(86) PCT No.: PCT/IB2007/002281
§ 371 (c)(1),
(2), (4) Date: Oct. 29, 2009

(87) PCT Pub. No.: WO2008/015569
PCT Pub. Date: Feb. 7, 2008

(65) Prior Publication Data
US 2010/0044165 A1 Feb. 25, 2010

(30) Foreign Application Priority Data

Jul. 31, 2006 (IT) .............................. MI2006A1513

(51) Int. Cl.
*F16D 55/224* (2006.01)
(52) U.S. Cl.
USPC ............. 188/71.8; 188/43; 188/59; 188/71.9; 188/79.56; 188/79.62; 188/196 D; 188/196 M; 188/198; 188/326; 188/196 V
(58) Field of Classification Search
USPC ....... 188/71.8, 71.9, 72.9, 59, 107, 196 P, 28, 188/43, 56
IPC ............................................. F16D 65/52,65/65
See application file for complete search history.

(56) References Cited

U.S. PATENT DOCUMENTS 2,911,070 A 11/1959 Seelig
3,148,749 A * 9/1964 Bushnell ........................ 188/59

(Continued)

FOREIGN PATENT DOCUMENTS

DE 26 07 348 A1 8/1977
EP 0 139 445 A 5/1985

(Continued)

OTHER PUBLICATIONS

EP Search Report Dated Mar. 27, 2008.

*Primary Examiner* — Robert A Siconolfi
*Assistant Examiner* — San Aung
(74) *Attorney, Agent, or Firm* — The Webb Law Firm (57) ABSTRACT

A disc-brake unit (10) for vehicles on rails, comprising a brake pincer consisting of a pair of jaws (14), provided with relative friction gaskets (16), intended to rub on the two opposite surfaces of a disc (12). The jaws (14) are hinged at one of the ends of a pair of levers (18). The levers (18) are pivoted on respective hinges (20) fixedly connected to the main body of the braking unit (10), and are actuated by a braking force motor (22) provided with at least one first piston (26) that moves with alternate motion along an axis (A). The braking unit (10) also comprises a group (68) for automatically regulating the clearances between the friction gaskets (16) and the disc (12). The piston (26) transmits the braking force to a thrusting mechanism (48; 48') inserted inside the braking force motor (22) to amplify and transfer the force, through the group (68) for automatically regulating the clearances and along an axis (B) perpendicular to the axis (A), to the ends of the levers (18) opposite the ends on which the jaws (14) are hinged.

12 Claims, 7 Drawing Sheets

(56) References Cited

U.S. PATENT DOCUMENTS

| | | | |
|---|---|---|---|
| 3,334,328 A | 8/1967 | Russell | |
| 3,838,757 A * | 10/1974 | Farr | 188/79.62 |
| 3,986,584 A * | 10/1976 | Wright et al. | 188/71.8 |
| 4,085,830 A * | 4/1978 | Bottoms et al. | 188/196 D |
| 4,308,937 A * | 1/1982 | Johnson | 188/43 |
| 4,416,356 A * | 11/1983 | Osborne | 188/326 |
| 4,567,966 A * | 2/1986 | Bayliss | 188/71.9 |
| 4,592,451 A * | 6/1986 | Persson | 188/71.9 |
| 4,705,147 A * | 11/1987 | Pressaco et al. | 188/196 D |
| 4,815,571 A * | 3/1989 | Margetts et al. | 188/79.62 |
| 6,367,367 B1 * | 4/2002 | Terada | 92/13.6 |

FOREIGN PATENT DOCUMENTS

| | | | | |
|---|---|---|---|---|
| EP | 0 524 867 A | | 1/1993 | |
| FR | 2 235 819 A | | 1/1975 | |
| GB | 525 328 A | | 8/1940 | |
| JP | S50-36870 | | 4/1975 | |
| JP | 2003156087 A | * | 5/2003 | F16D 65/56 |
| WO | 2009010185 A1 | | 1/2009 | |

* cited by examiner

COMPACT DISC-BRAKE UNIT FOR VEHICLES ON RAILS

The present invention refers to an integrated compact unit for generating braking force, particularly intended to be used on wheel sets of railway vehicles.

Disc-brake units of the type comprising a brake pincer consisting of a pair of jaws that act by friction on the surface of the disc itself are known. In railway applications, the jaws are usually commanded by a pair of levers opposite the plane on which the disc lies, such levers being actuated by a braking force motor like for example a pneumatic or hydraulic cylinder. Therefore, a wear compensation, or clearance recovery, mechanism is foreseen, capable of keeping the distance between the jaws and the disc unchanged following the variation (decrease) in thickness of the brake pads due to their wearing, and at the same time capable of being unaffected by the relative axial displacement with respect to the carriage or frame that the wheel set of the vehicle can undergo during travel.

The current tendency of the main producers of disc brakes of the type described above is to make particularly compact brake units, suitable for being mounted integral with the carriage or with the frame of a railway vehicle so as to be able to act upon each relative brake disc, normally fixed on the axle or wheel of the vehicle itself.

However, it is clear that as the size of the brake device decreases there is also a reduction in the performance of the device itself, with the consequent need to apply complex and expensive additional mechanisms, sometimes separate from the pneumatic or hydraulic actuator cylinder, capable of increasing the braking force.

The purpose of the present invention is therefore to solve the problems of the prior art, by making a compact unit for generating braking force, particularly for railway vehicles, capable of providing high performance both in normal travel conditions, in other words during the activation of the service brake, and in stationary conditions of the vehicle, i.e. when the unit is used as a parking brake.

Another purpose of the invention is to make a compact disc-brake unit for vehicles on rails capable of autonomously performing many functions, in this case the functions of a service brake and parking brake and of compensating the variations in distance between the pads and the brake disc, reducing the number of components and also making it simpler to make than the brake devices according to the prior art.

Yet another purpose of the invention is to be able to have a compact disc-brake unit for vehicles on rails in which it is not necessary to add auxiliary devices to carry out some functions, like for example increasing the braking force for the same size of the actuator cylinder, or else preventing the undesired activation of the clearance recovery mechanism.

The last but not least purpose of the present invention is to make a compact disc-brake unit for vehicles on rails that is particularly simple and cost-effective in terms of both its manufacture and its periodic maintenance.

These purposes according to the present invention are accomplished by making a compact unit for generating braking force, particularly suitable for use on railway vehicles or vehicles on rails, as outlined in claim 1. Further characteristics of the invention are outlined by the subsequent claims.

The characteristics and advantages of a compact unit for generating braking force, particularly for railway vehicles or vehicles on rails, according to the present invention shall become clearer from the following description, given as a non-limiting example, referring to the attached schematic drawings, in which.

Figure 1A:
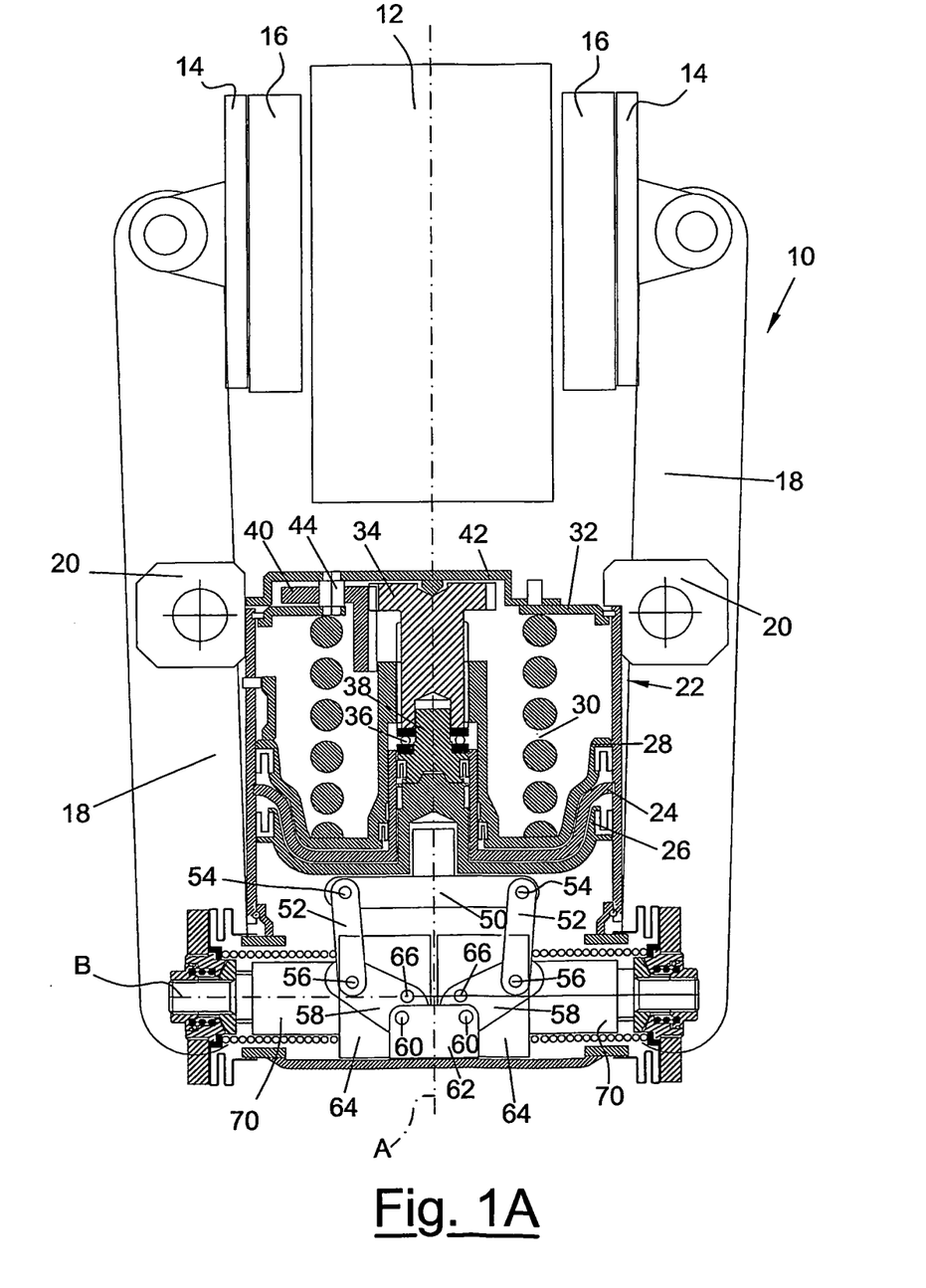
FIG. 1A is a partial section view of a compact disc-brake unit according to the present invention, suitable for carrying out both the function of a service brake and that of a parking brake.
Figure 1B:
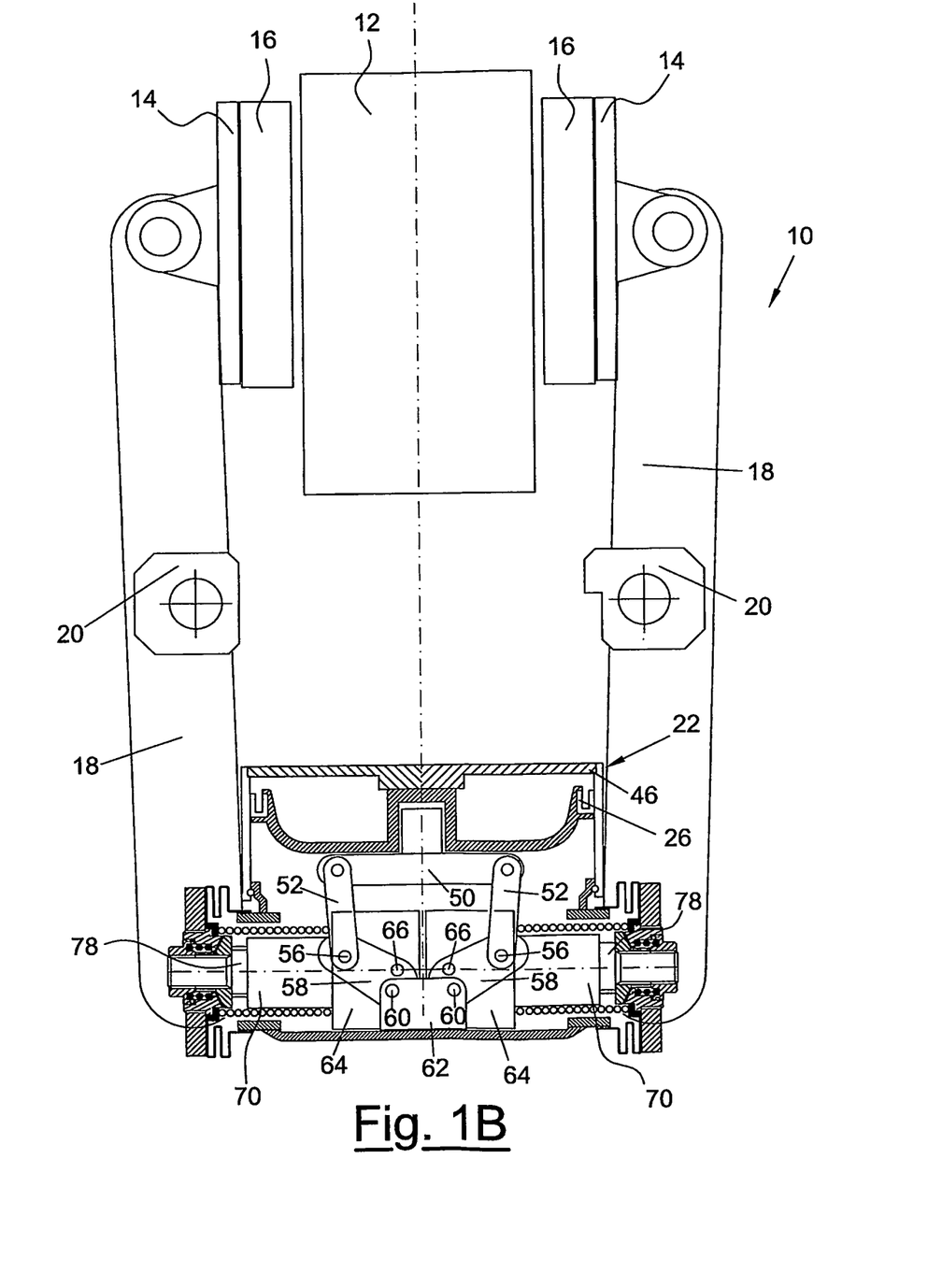
FIG. 1B is a partial section view of a compact disc-brake unit according to the present invention, particularly intended to carry out just the service brake function.

With reference in particular to FIGS. 1A and 1B of the attached drawings, a preferred example embodiment of a compact brake unit, wholly indicated with reference numeral 10, for a disc brake 12 of a vehicle particularly intended to travel on rails.

The braking unit 10 firstly comprises a pair of jaws 14, provided with relative friction gaskets 16, intended to rub on the two opposite surfaces of the disc 12 that can be mounted on the axle or else on the wheel of the vehicle. The jaws 14 are hinged at one of the ends of a pair of levers 18, in turn pivoted on respective hinges 20 fixedly connected to the main body of the braking unit 10, and they are actuated by a braking force motor 22, in this case a pneumatic or hydraulic actuator cylinder.

The assembly consisting of the jaws 14, the friction gaskets 16 and the pair of opposite levers 18 forms the actual brake pincer of the braking unit 10 according to the present invention.

The pneumatic or hydraulic actuator cylinder 22, in the embodiment that foresees the use of the braking unit 10 of the invention both as a service brake and as a parking brake (FIG. 1A), is divided into two chambers by a partition element 24. The piston 26 for service braking is located in one of the chambers and the piston 28 for parking braking is in the other, coaxial to the aforementioned piston 26.

According to a particularly preferred example embodiment, the mechanism that generates the force for the parking brake comprises a spring 30, housed between the piston 28 for parking braking and a cover 32, whereas the group that transfers the force from the spring 30 to the piston 26 for service braking is made up of a gearing-trapezoidal screw 34, an axial bearing 36, an intermediate component 38, a locking lever 40, a cover 42 and a pin 44.

On the other hand, in the configuration in which just service braking is foreseen (FIG. 1B), the actuator cylinder 22 houses a single piston 26 for service braking and is defined by a wall 46.

According to the invention, the pistons 26 and 28 act upon a thrusting mechanism 48 to amplify the force inserted inside the actuator cylinder 22. Such a mechanism or linkage 48, illustrated in FIGS. 1A and 1B and, in partial detail, in FIG. 3 based upon a first example embodiment thereof, substantially comprises a first lever 50, arranged perpendicular to the direction A of movement of the pistons 26 and 28 and on which the piston 26 acts resting against it as a service brake, and a pair of levers 52 hinged, at a first end thereof 54, on the opposite ends of the lever 50.

Figure 3:
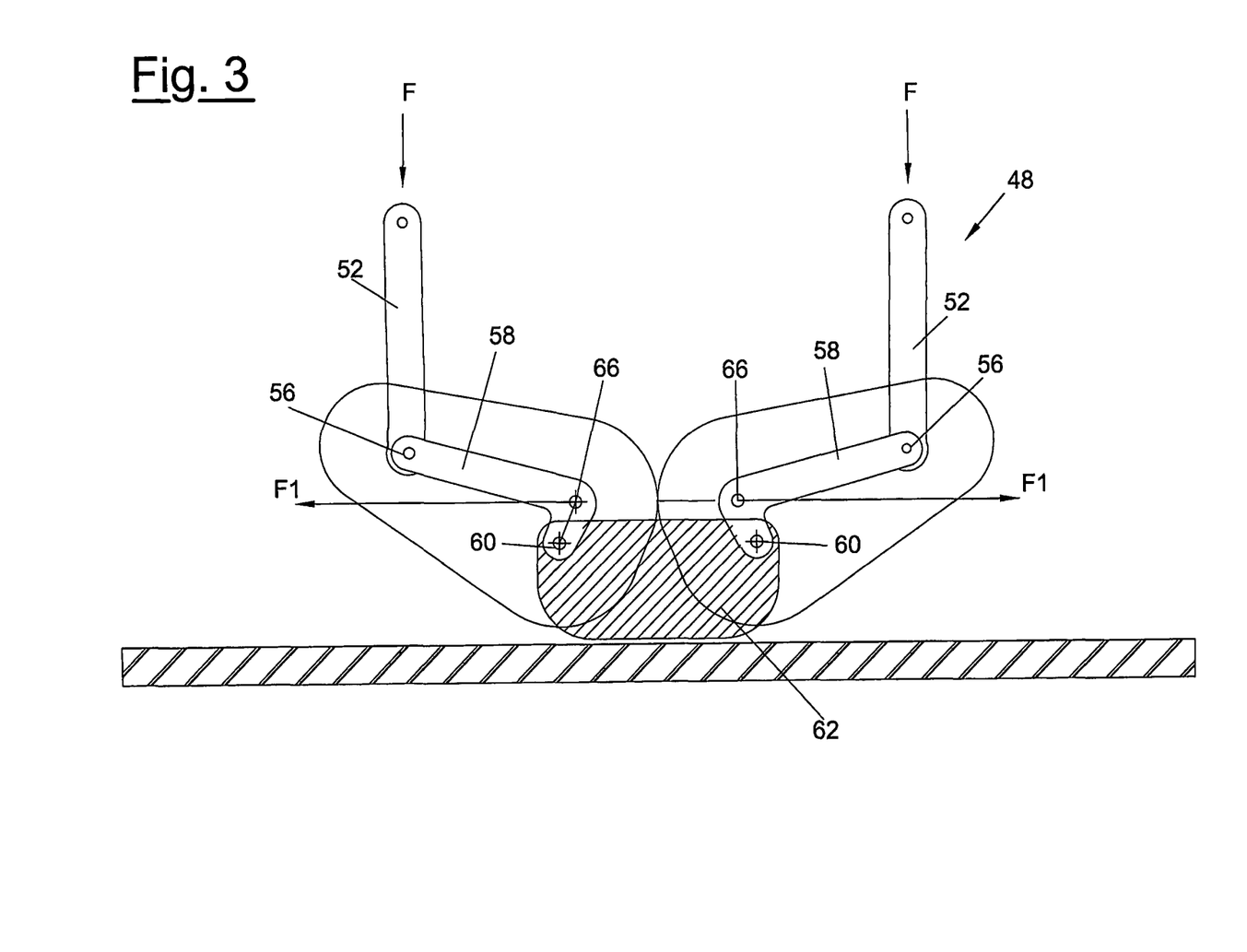
FIG. 3 is a detailed view, based upon a first example embodiment, of the amplification mechanism of the braking force equipped with the compact disc-brake unit according to the present invention.

In turn, each lever 52 is further hinged, at a second end 56, on a further pair of levers 58, the pair of levers 58 finally being pivoted, by means of pins 60, on a support plate 62 integral with the main body of the actuator cylinder 22.

The pair of levers 58 is therefore able to transfer the force transmitted by the piston 26 or, if present, by the piston 28 to clutches 64, each connected to the corresponding lever 58 by means of a suitable pin 66.

Figure 4A:
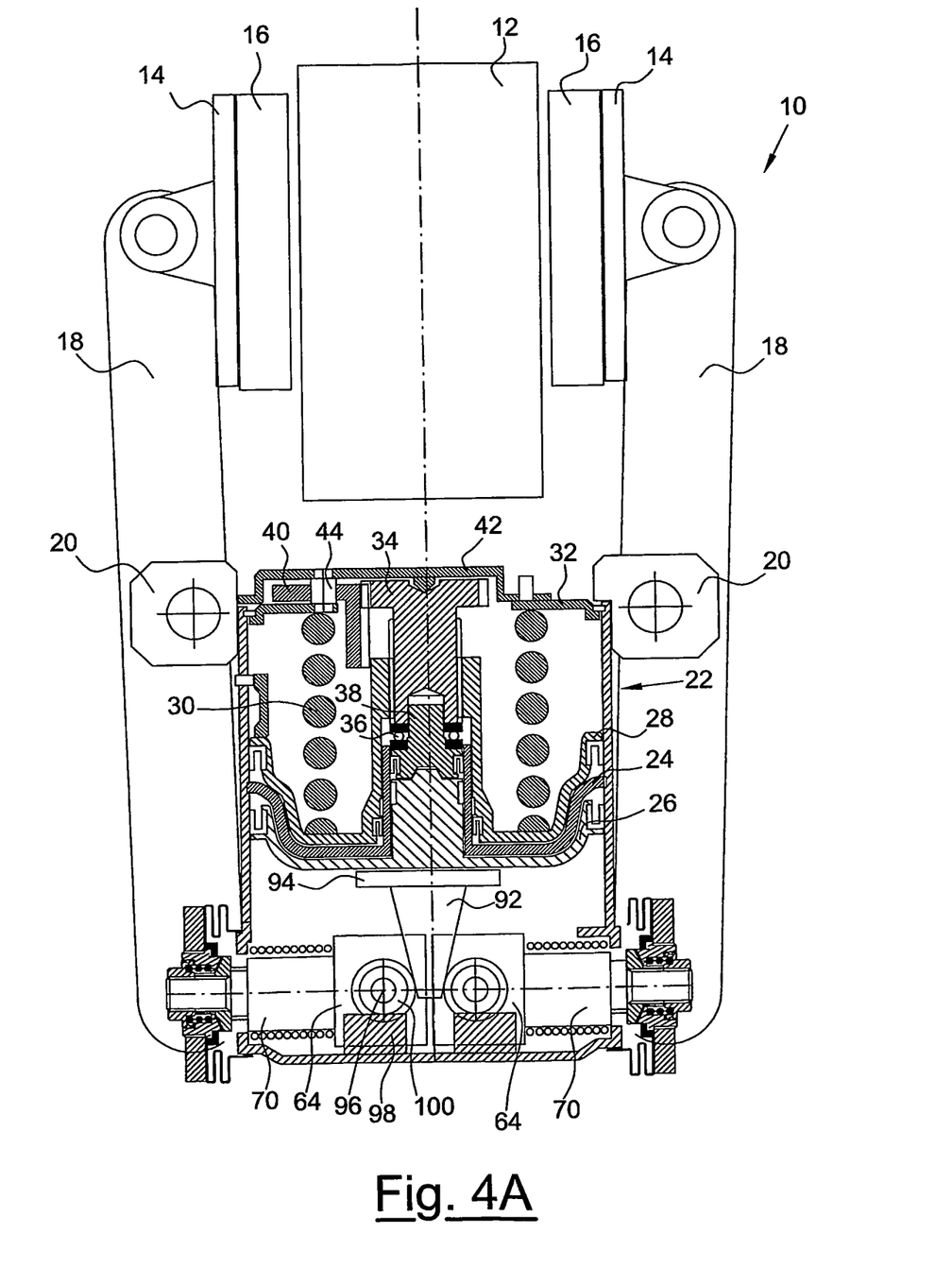
FIG. 4A is a partial section view of a second example embodiment of the compact disc-brake unit according to the present invention, suitable for carrying out both the function of a service brake and that of a parking brake.
Figure 4B:
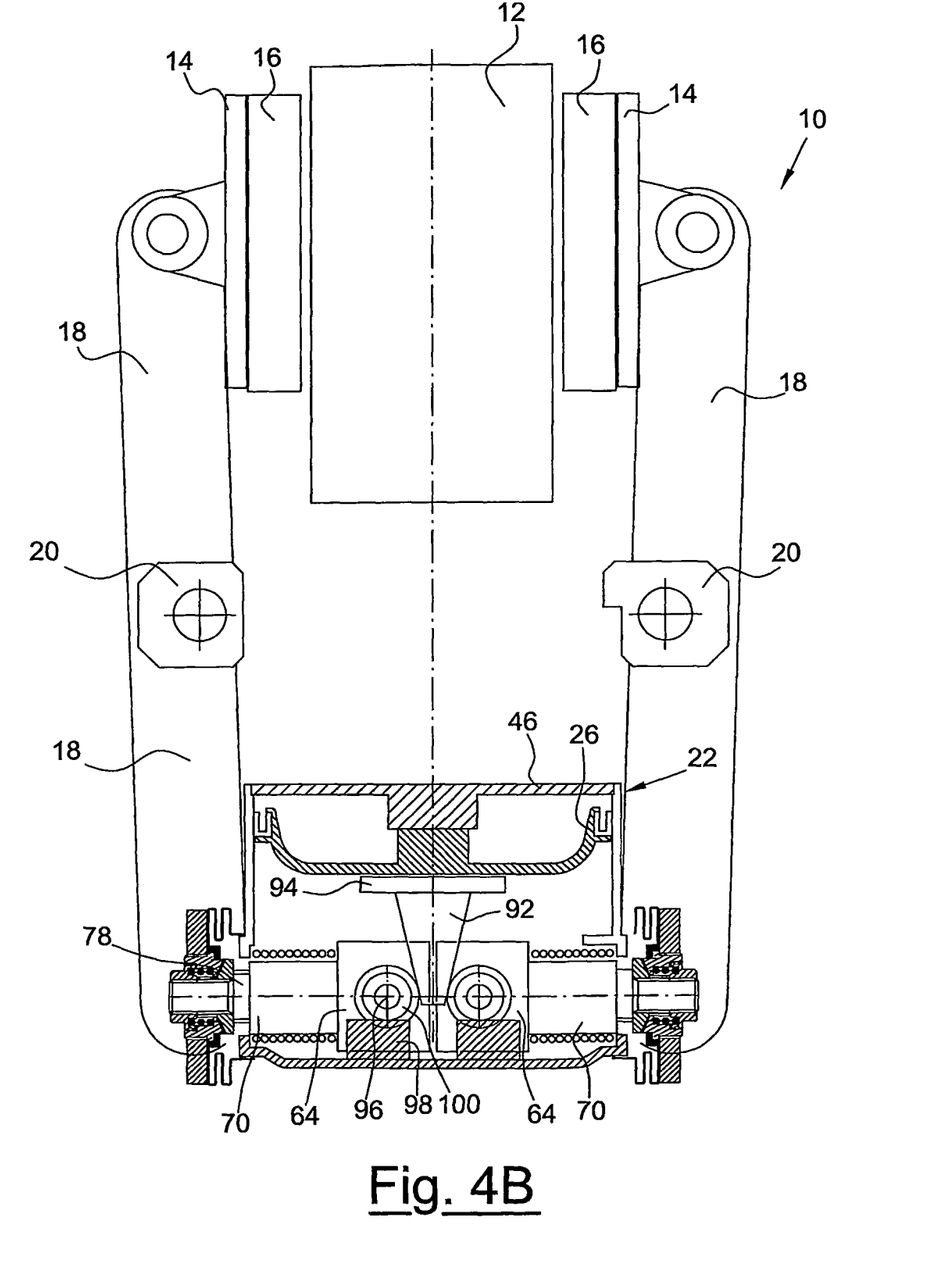
FIG. 4B is a partial section view of a second example embodiment of the compact disc-brake unit according to the present invention, particularly intended to carry out just the service brake function.

As an alternative to the lever-operated thrusting linkage 48 described up to now, it is possible to use a simplified wedge-operated thrusting mechanism 48' having the same functions. As shown in FIGS. 4A and 4B and, in greater detail, in FIG. 5, the thrusting mechanism 48' comprises a wedge-shaped element 92 that extends substantially along the direction A of movement of the pistons 26 and 28 and on the base of which 94 the piston 26 for service braking acts resting against it. The wedge-shaped element 92 cooperates with a pair of opposite bearings 96 with respect to the axis A, hinged to the clutches 64 and in contact with suitable guides 98 integral with the main body of the actuator cylinder 22.

Figure 5:
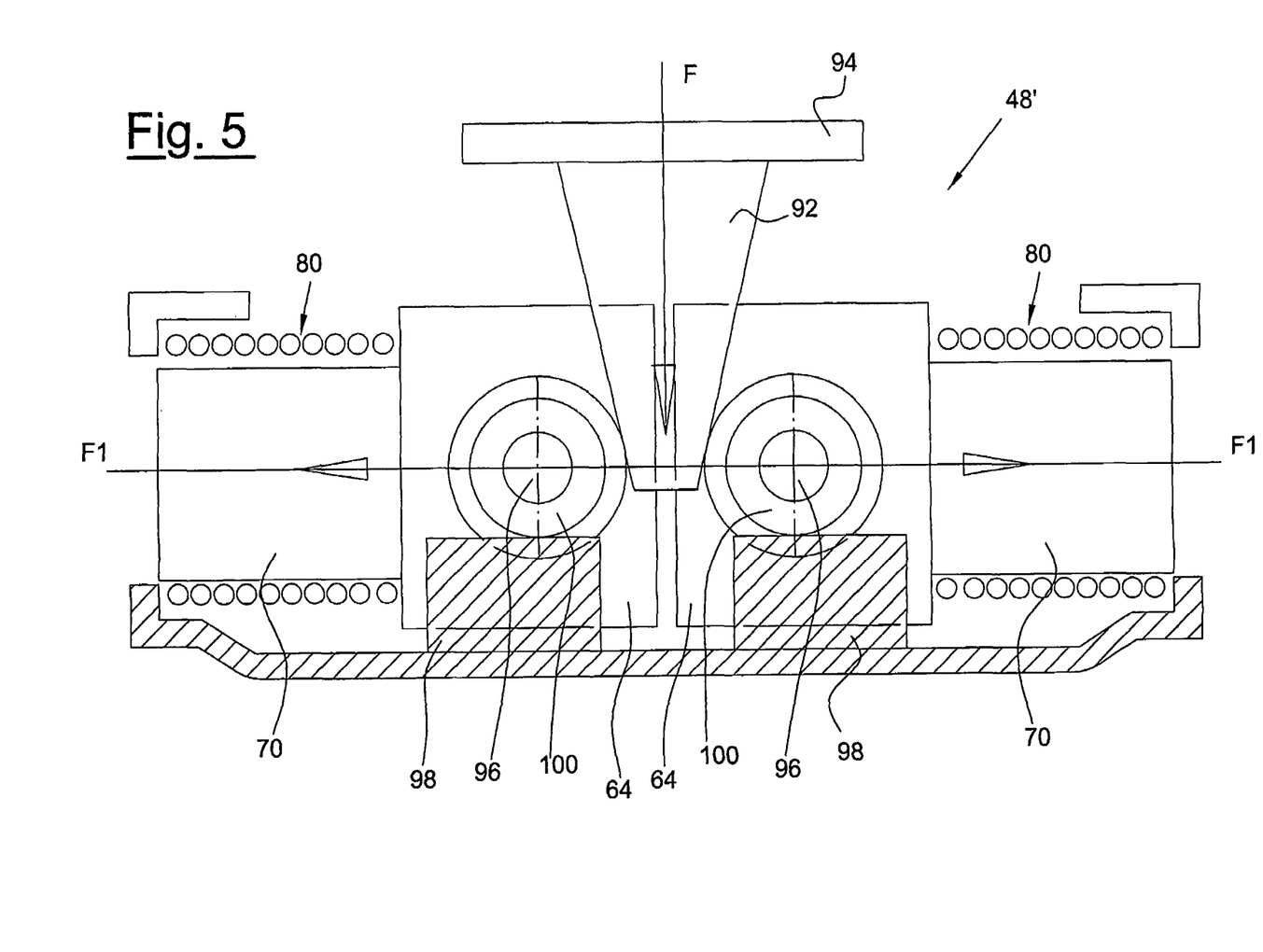
FIG. 5 is a detailed view, based upon a second example embodiment, of the amplification mechanism of the braking force equipped with the compact disc-brake unit according to the present invention.

The wedge-shaped element 92 transfers and amplifies the force transmitted by the piston 26 or, if present, by the piston 28 to the bearings 96 and, consequently, to the clutches 64.

The function of the clutches 64 is to send the braking force generated inside the actuator cylinder 22 to the brake pincer, in particular to the ends of the levers 18 opposite those on which the jaws 14 are fixedly connected.

According to the invention, the group 68 for automatically regulating the clearances that form between the friction gaskets 16 and the brake disc 12, for example due to the wearing of the gaskets 16 themselves, consists of two clearance regulation mechanisms 70, or wear compensators, positioned symmetrically with respect to the longitudinal axis A of the pistons 26 and 28 and able to be operated in the direction of the axis B, perpendicular to the aforementioned axis A.

Figure 2:
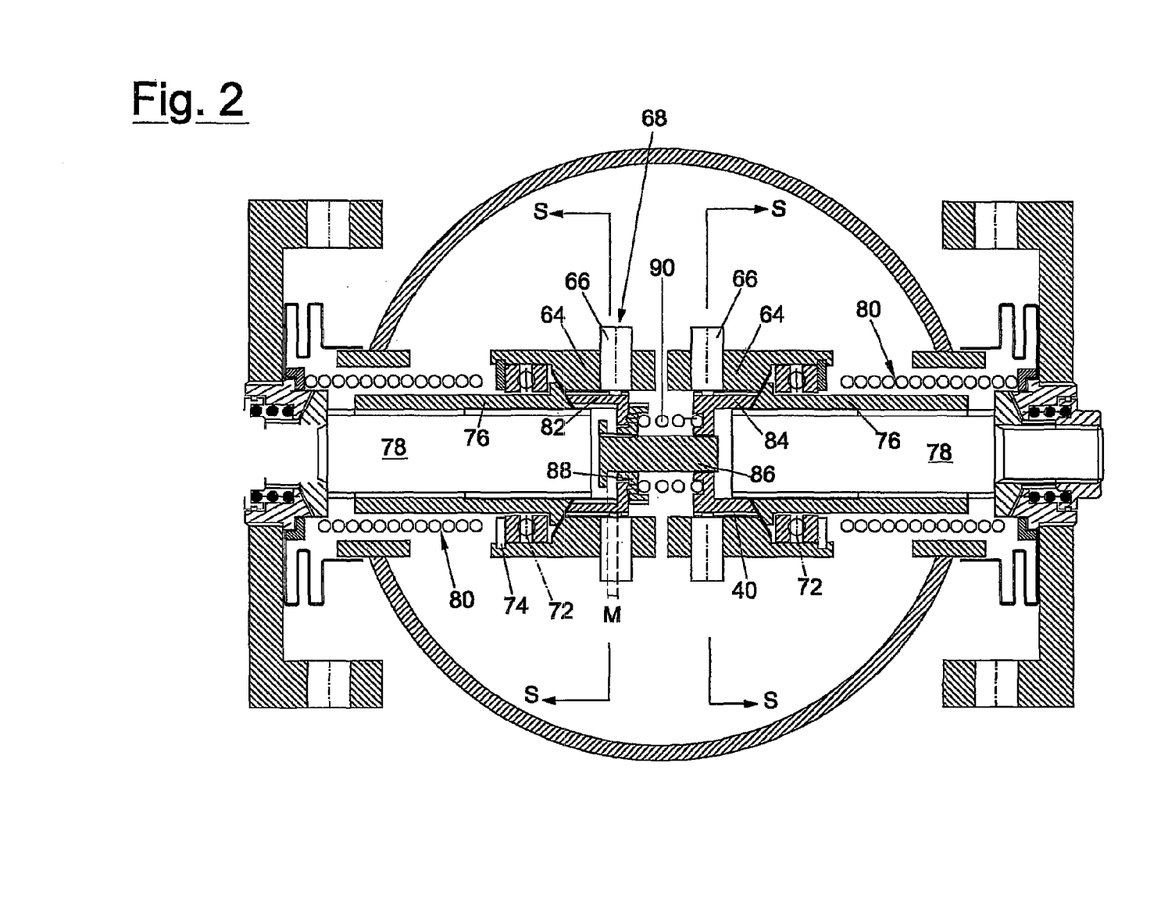
FIG. 2 is a cross section view of a compact disc-brake unit according to the present invention, which illustrates the mechanism for applying the braking force to the pair of levers on which the jaws and the clearance recovery mechanism are made integral.

Based upon the illustrated example embodiment and with particular reference to FIG. 2 of the attached drawings, each clearance regulation mechanism 70 comprises an internal thread 76 capable of receiving the braking force of each clutch 64, a trapezoidal screw 78 operatively connected to the internal thread 76 and to the corresponding lever 18, an axial bearing 72 and an elastic ring 74, coaxial and arranged between the clutch 64 and the internal thread 76, and a coil spring 80 that acts upon each trapezoidal screw 78. The internal threads 76 and the respective trapezoidal screws 78 are connected together by a multi-start thread.

In detail, to vary the size of the clearance existing between the friction gaskets 16 and the brake disc 12 according to the specific applications, as shall be explained hereafter, each clearance regulation mechanism 70 is also equipped, in the portion facing towards the middle axis A of the braking unit 10, with respective opposite locking bushes 82 and 84, which act in abutment against the inner threads 76 pushed by a coil spring 90 arranged in compression between them.

The locking bushes 82 and 84 are then interconnected by means of a regulation screw 86 and a toothed bush 88. The toothed bush 88 can be operated to regulate the distance M between the head of the regulation screw 86. and the front part of one of the locking bushes 82, such a distance M being able to be set according to the distance that one wishes to keep between the disc 12 and the friction gaskets 16 in the rest conditions of the braking unit 10.

With reference in particular to the example embodiments illustrated in FIGS. 1A and 4A, the operation of the braking unit 10 according to the present invention shall now be briefly described.

The actuation force of the service braking is generated by the action of compressed air or, alternatively, of a pressurised hydraulic fluid, which enters into the portion of the actuator cylinder 22 intended for the service brake through a suitable inlet hole (not shown). The air, or the hydraulic fluid, acts upon the piston 26 for service braking, which advances inside the cylinder 22 compressing the lever 50 of the thrusting linkage for amplifying the force 48.

As shown in FIG. 3, the braking force transmitted by the piston 26 to the lever 50 is divided into the two components F acting on the levers 52 and, from these and by means of the further two levers 58, such a force is amplified and transferred, through the pins 66 and in the direction of the axis B (F1 in FIG. 3) perpendicular to that of the aforementioned components F, to the clutches 64.

In the example embodiment illustrated in FIGS. 4A, 4B and 5, the braking force amplification function is, on the other hand, left to the wedge-shaped mechanism 48'. As shown in FIGS. 4A and 4B, the braking force transmitted by the piston 26 to the wedge-shaped element 92 moves the latter along the axis A towards the bearings 96. Such a wedge-shaped element 92 thus acts upon the bearings 96 to amplify, with variable magnitude according to the angle of inclination of the wedge 92 itself, the braking force so as to transfer it, through the reaction of the axial locking discs 100 of the bearings 96 against the guides 98 integral with the base plate of the actuator cylinder 22, to the clutches 64 in the direction of the axis B (F1 in FIG. 5) perpendicular to the direction A along which the piston 26 moves.

From the clutches 64 the amplified force is then sent, directly through the two clearance recovery and regulation mechanisms 70, to the brake pincer and finally to the friction gaskets 16 that act on the disc 12.

When the braking unit 10 is also equipped with the parking brake function and the relative piston 28 (FIG. 1A), the parking brake itself is reloaded through the inlet of compressed air, or of pressurised hydraulic fluid, in the portion of the cylinder 22 intended for the parking brake. The air, or the pressurised hydraulic fluid, pushes the piston 28 for parking braking, which compresses the spring 30.

During the movement of the piston 28, the gearing-trapezoidal screw 34, which is connected through a multi-start threading with the piston 28 itself, carries out a rotation. The gearing-trapezoidal screw 34 and the locking lever 40 functionally represent a unidirectional anti-rotation mechanism so that, when the gearing-trapezoidal screw 34 rotates, a certain number of its teeth are ridden over by the locking lever 40.

The actuation force of the parking brake is generated by the spring 30 and takes place by discharging the compressed air, or the pressurised hydraulic fluid, through a suitable outlet hole (not shown), from the portion of the cylinder 22 intended for the parking brake.

When the piston 28 for the parking brake moves from its initial position, due to the unidirectional anti-rotation connection with the locking lever 40, the rotation of the gearing-trapezoidal screw 34 is not permitted, thus the gearing-trapezoidal screw 34 itself and the piston 28 functionally act as a unit and the gearing-trapezoidal screw 34 advances.

The gearing-trapezoidal screw 34, through the axial bearing 36 and the intermediate component 38, transfers the force to the piston 26 for service braking, thus actuating the parking brake of the vehicle in the same way in which the normal service braking described previously takes place.

Also in this case, indeed, the braking force is transferred to the thrusting mechanism for amplifying the force 48 or 48' and, from it, reaches the brake pincer directly through the two opposite clearance recovery and regulation mechanisms 70.

Therefore, it must be noted that, both in the case of service braking and in the case of parking braking, the braking force is always transferred to the thrusting mechanism for amplifying the force 48 or 48' solely through the piston 26 for service braking.

By feeding the portion of the cylinder 22 intended for the parking brake with air or pressurised hydraulic fluid, the parking brake itself can finally be decoupled, thus placing the vehicle in the normal travel conditions.

Now with reference to FIG. 2, the operation of the group 68 for automatically regulating the clearances shall be illustrated, both in the case of service braking and in the case of parking braking.

The braking force that the clutches 64 receive from the thrusting mechanism for amplifying the force 48 or 48' follows the direction of the arrows S of FIG. 2. Following the application of the force, the inner threadings 76 of each clearance regulation mechanism 70 begin to translate in the same direction. Simultaneously, under the action of the force of the spring 90, the locking bushes 82 and 84 also begin to separate from one another.

At the same time, when the total distance M that separates the head of the regulation screw 86 from the front part of the locking bush 82 has been covered or, in other words, when there is contact between the head of the regulation screw 86 and the front part of the locking bush 82, the separation between the two opposite locking bushes 82 and 84 ends so that, if the clutches 64 continue to advance, the inner threadings 76 of the mechanisms 70 rotates due to the separation by the relative bushes 82 and 84.

Thereafter, under the action of the force of the springs 80, the trapezoidal screws 78 protrude from the main body of the cylinder 22, in the direction of the axis B (FIG. 1A), pushing the levers 18 of the brake pincer that, rotating about its own hinges 20, take the jaws 14 closer to the brake disc 12.

At the moment when the friction gaskets 16 come into contact with the brake disc 12, the trapezoidal screws 78 stop advancing, the relative inner threadings 76 lock once again and the actual braking process begins.

The variation in clearance existing between the friction gaskets 16 and the brake disc 12 takes place through the screwing of the regulation screw 86, rotating the toothed bush 88 during the normal testing operations of the braking unit, with the result of the variation in the distance M and the consequent modification of the size of the clearances.

It has thus been seen that the compact unit for generating braking force, particularly for railway vehicles or vehicles on rails, according to the present invention achieves the purposes outlined earlier, transferring the braking force itself, increased by means of the amplification mechanisms described above, directly to the two clearance recovery mechanisms connected to the brake pincer, at the ends of which are the friction gaskets that act on the disc.

An important advantage due to the use of two opposite recovery mechanisms is the fact that, working independently but being made integral with each other by simple elements that allow their relative movements in space, they autonomously compensate the transversal movements of the braking unit, integral with the carriage or with the frame of the vehicle, with respect to the brake disc, fixed onto the axle or onto the wheel, and they do not need an additional device suitable for preventing the undesired application of the clearance recovery mechanism in the case of transversal movement of the carriage during normal travel of the vehicle itself. In the braking units according to the prior art, the undesired application of the clearance recovery mechanism is, on the other hand, prevented through complex assemblies based upon mechanical shafts or relays.

Thanks to the presence of the force amplification mechanism based upon levers or else wedges, which allows the reduction of the effective area of the cylinders on which the pressure of the air or of the hydraulic fluid, there is a reduction in bulk of the cylinders themselves, with clear advantages in terms of compactness of the braking unit as a whole.

In this way a simple and compact device is obtained, which performs many functions reducing the number of components, also making it simpler to make compared to braking devices according to the prior art, since the inner force amplification system consists of simple levers or wedges and not of complex mechanisms based essentially upon cams or eccentrics.

The invention is therefore aimed at maintaining high performance, at the same time reducing the manufacturing and maintenance costs, thanks to the presence of a smaller number of components.

The compact disc-brake unit for vehicles on rails of the present invention thus conceived is also able to be integrated and personalised according to the client's requirements with all devices normally used in the field of rail travel, like for example manual or pneumatic unlocking of the parking brake, anticompound valve (selector valve that avoids the simultaneous action of the service brake and the parking brake), sensor for indicating the state of the parking brake and/or valve X (optional device designed for cylinders with spring-actuated parking brake with the purpose of preventing the incorrect application of the parking brake, while the vehicle is travelling, caused by the lack of pressurised air in the cylinder chamber of the parking brake following a malfunction, for example when the pneumatic supply pipes breaks.

The compact disc-brake unit for vehicles on rails of the present invention thus conceived can in any case undergo numerous modification and variants, all of which are covered by the same inventive concept.

Moreover, in practice the materials used, as well as their sizes and the components, can be whatever according to the technical requirements.

The invention claimed is:

1. Disc-brake unit (10) for vehicles on rails, comprising a brake pincer consisting of a pair of jaws (14), provided with relative friction gaskets (16), intended to rub on the two opposite surfaces of a disc (12), said jaws (14) being hinged at one of the ends of a pair of levers (18), said levers (18) being pivoted on respective hinges (20) fixedly connected to the main body of said braking unit (10), and being actuated by a braking force motor (22) provided with at least one first piston (26) that moves with alternate motion along a first axis (A), said braking unit (10) also comprising a group (68) for automatically regulating the clearances between said friction gaskets (16) and said disc (12), characterised in that said piston (26) transmits said braking force to a thrusting mechanism (48; 48') to amplify and transfer said braking force to said group (68) for automatically regulating the clearances, and said group (68) for automatically regulating the clearances transmitting said braking force along a second axis (B) perpendicular to said first axis (A) to the ends of said levers (18) opposite the ends on which the jaws (14) are hinged, wherein said group (68) for automatically regulating the clearances lies along the second axis (B) and comprises two clearance regulating mechanisms (70), positioned symmetrically with respect to said first axis (A) and operated along said second axis (B); and     wherein each clearance regulating mechanism (70) comprises, in the portion facing towards said first axis A respective opposite locking bushes 82 84 and said locking bushes (82, 84) are interconnected by means of a regulation screw (86).

2. Braking unit (10) according to claim 1, characterised in that said braking force motor (22) is provided with at least one second piston (28) for parking braking, coaxial to said first piston (26).

3. Braking unit (10) according to claim 2, characterised in that said second piston (28) transmits the parking brake actuation force to said thrusting mechanism (48; 48') through said first piston (26).

4. Braking unit (10) according to claim 1, characterised in that said thrusting mechanism (48) comprises a first lever (50), arranged perpendicular to said axis (A) and on which said piston (26) acts resting against it, a pair of levers (52) hinged, at a first end (54) thereof, on the opposite ends of said lever (50) and, at a second end (56) thereof, on a further pair of levers (58), each of said levers (58) transferring said braking force to the corresponding clearance regulating mechanism (70) along said axis (B).

5. Braking unit (10) according to claim 4, characterised in that said pair of levers (58) is pivoted, by means of respective pins (60), on a support plate (62) integral with the main body of said braking force motor (22).

6. Braking unit (10) according to claim 4, characterised in that each of said levers (58) transfers said braking force to the corresponding clearance regulating mechanism (70) by means of a clutch (64) made integral with the corresponding lever (58) by means of at least one pin (66).

7. Braking unit (10) according to claim 1, characterised in that said thrusting mechanism (48') comprises at least one wedge-shaped element (92) that extends substantially along said first axis (A) and on the base (94) of which said piston (26) acts resting against it, said wedge-shaped element (92) cooperating with at least one pair of bearings (96), opposite with respect to said first axis (A) and equipped with relative axial locking discs (100) in contact with respective guides (98) integral with the main body of said braking force motor (22), to transfer said braking force to the corresponding clearance regulating mechanism (70) along said second axis (B).

8. Braking unit (10) according to claim 7, characterised in that each of said bearings (96) transfers said braking force to the corresponding clearance regulating mechanism (70) by means of a clutch (64) on which each of said bearings (96) is hinged.

9. Braking unit (10) according to claim 1, characterised in that each clearance regulating mechanism (70) comprises an inner threading (76) capable of receiving the braking force from said thrusting mechanism (48; 48'), a trapezoidal screw (78) operatively connected to said inner threading (76) and to the corresponding lever (18), and a coil spring (80) that acts upon each of said trapezoidal screws (78).

10. Braking unit (10) according to claim 1 wherein the respective opposite locking bushes (82, 84) act in abutment against said inner threadings (76) and are pushed by a spring (90) placed in compression between them.

11. Braking unit (10) according to claim 10, characterised in that said locking bushes (82, 84) are interconnected by means of the regulation screw (86) and a toothed bush (88).

12. Braking unit (10) according to claim 11, characterised in that said toothed bush (88) can be operated to regulate the distance (M) between the head of said regulation screw (86) and the front part of one of said locking bushes (82), said distance (M) being able to be set according to the distance that one wishes to maintain between said disc (12) and said friction gaskets (16) in rest conditions of the braking unit (10).

\* \* \* \* \*

UNITED STATES PATENT AND TRADEMARK OFFICE
CERTIFICATE OF CORRECTION

PATENT NO. : 8,794,393 B2
APPLICATION NO. : 12/309725
DATED : August 5, 2014
INVENTOR(S) : Vasil Argirovski

It is certified that error appears in the above-identified patent and that said Letters Patent is hereby corrected as shown below:

In the Claims

Column 7, Line 7, Claim 1, delete "A" and insert -- (A), --

Column 7, Line 8, Claim 1, delete "82 84" and insert -- (82, 84), --

Signed and Sealed this
Ninth Day of December, 2014

Michelle K. Lee
*Deputy Director of the United States Patent and Trademark Office*